Patented May 25, 1943

2,320,029

UNITED STATES PATENT OFFICE 2,320,029

9,9-DI-(γ-AMINOPROPYL)-FLUORENE

Herman A. Bruson, Philadelphia, Pa., assignor to
The Resinous Products & Chemical Company,
Philadelphia, Pa., a corporation of Delaware No Drawing. Application April 4, 1942,
Serial No. 437,678

1 Claim. (Cl. 260—578)

This invention relates to 9,9-di(γ-aminopropyl)-fluorene, a new compound having the formula—

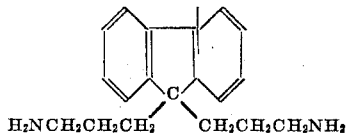

This substance is a valuable intermediate for the preparation of synthetic resins.

9,9-di-(γ-aminopropyl)-fluorene can be prepared by catalytic reduction of 9,9-di-(β-cyanoethyl)-fluorene which is obtained by condensing fluorene with acrylonitrile as described in my copending application, Serial No. 391,501, filed May 2, 1941, Pat. No. 2,280,058, issued Apr. 21, 1942, of which this application is a continuation-in-part. The reduction can be carried out by dissolving 9,9-di-(β-cyanoethyl)-fluorene in an inert solvent such as dioxane or alcohol, mixing the solution with a hydrogenating catalyst, such as finely divided active nickel, and subjecting the mixture to hydrogen under a superatmospheric pressure, such as 500 to 2,000 pounds per square inch at an elevated temperature, preferably from about 75° to 150° C. Under these conditions the fluorene ring remains unhydrogenated whereas the two nitrile groups are reduced to primary amino groups.

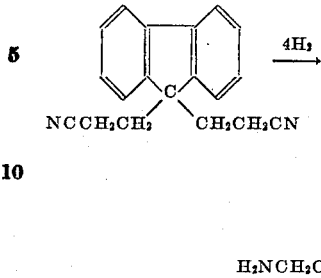

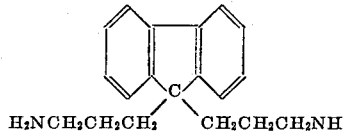

A mixture of 55 parts of pure 9,9-di-(β-cyanoethyl)-fluorene, 5 parts of Raney nickel for hydrogenation, and 125 parts of ethanol was shaken in a bomb heated to 100–120° C. for about eight hours with hydrogen under a pressure of 1,500 pounds per square inch until no more hydrogen was absorbed. The product was filtered to remove the nickel and the alcohol evaporated off from the filtrate. The residual oil was distilled under a good vacuum.

The 9,9-di-(γ-aminopropyl)-fluorene distilled over at 215/225°/2 m. m. as a pale yellow thick liquid.

I claim:

As a new compound, 9,9-di-(γ-aminopropyl)-fluorene.

HERMAN A. BRUSON.